United States Patent
Melendez-Calderon et al.

(10) Patent No.: US 10,529,254 B2
(45) Date of Patent: Jan. 7, 2020

(54) HAPTIC DEVICE AND METHODS FOR ABNORMAL LIMB BIOMECHANICS

(71) Applicant: Rehabilitation Institute of Chicago, Chicago, IL (US)

(72) Inventors: Alejandro Melendez-Calderon, Zurich (CH); Davide Piovesan, Erie, PA (US); Ferdinando A. Mussa-Ivaldi, Evanston, IL (US)

(73) Assignee: Rehibilitation Institute of Chicago, Chicago, IL (US)

( * ) Notice: Subject to any disclaimer, the term of this patent is extended or adjusted under 35 U.S.C. 154(b) by 414 days.

(21) Appl. No.: 14/706,697

(22) Filed: May 7, 2015

(65) Prior Publication Data

US 2016/0005338 A1  Jan. 7, 2016

Related U.S. Application Data

(60) Provisional application No. 61/991,370, filed on May 9, 2014.

(51) Int. Cl.
G09B 23/32 (2006.01)
G09B 23/30 (2006.01)
G09B 23/34 (2006.01)

(52) U.S. Cl.
CPC .............. *G09B 23/32* (2013.01); *G09B 23/30* (2013.01); *G09B 23/34* (2013.01)

(58) Field of Classification Search
CPC ..................................................... G09B 23/32
USPC ......................................................... 434/267
See application file for complete search history.

(56) References Cited

U.S. PATENT DOCUMENTS 5,466,213 A * 11/1995 Hogan ..................... A61H 1/02
                                                                    482/4
6,063,044 A    5/2000 Leonard et al.
6,589,190 B2   7/2003 Kanderian, Jr. et al.
7,125,388 B1 * 10/2006 Reinkensmeyer ..........
                                                              A63B 69/0064
                                                                    601/5
(Continued)

FOREIGN PATENT DOCUMENTS

EP    2134257 A1    12/2009

OTHER PUBLICATIONS

Park et al, Development of a Haptic Elbow Spasticity Simulator (HESS) for Improving Accuracy and Reliability of Cllinical Assessment of Spasticity, IEEE Transactions on Neural Systems and Rehabilitation Engineering, May 2012, vol. 20, No. 3, p. 361-370.*

(Continued)

*Primary Examiner* — Robert J Utama
(74) *Attorney, Agent, or Firm* — Polsinelli PC; Ari M. Bai

(57) ABSTRACT

The system and methods describe relate to the diagnosis and quantification of abnormal limb biomechanics. Different embodiments may be used to train clinicians in better understanding the causality of haptic sensation associated with neurological impairments and abnormal biomechanics during manipulation of a patients' limb. The system and methods may be used as a tool in which clinicians participate in the diagnosis of abnormal biomechanics. In one embodiment, assessment of abnormal biomechanics may be performed remotely. In another embodiment, the system may be used as a test bed for developing novel assessment techniques and targeted interventions.

14 Claims, 13 Drawing Sheets

(56) References Cited

U.S. PATENT DOCUMENTS

| | | | |
|---|---|---|---|
| 7,289,106 B2* | 10/2007 | Bailey | G06F 3/016 345/156 |
| 7,478,009 B2 | 1/2009 | Cabrera et al. | |
| 7,597,017 B2* | 10/2009 | Bedard | G09B 23/32 434/256 |
| 8,002,717 B2 | 8/2011 | Fagergren et al. | |
| 8,317,730 B2 | 11/2012 | Zhang et al. | |
| 8,485,996 B2* | 7/2013 | Bluman | A61H 1/0274 601/23 |
| 8,535,063 B1* | 9/2013 | Amato | G09B 23/32 434/270 |
| 10,108,266 B2* | 10/2018 | Banerjee | G06F 3/016 |
| 2004/0254771 A1* | 12/2004 | Riener | G09B 23/32 703/7 |
| 2005/0020409 A1* | 1/2005 | Hayamizu | G09B 19/0038 482/51 |
| 2007/0012105 A1* | 1/2007 | Engsberg | G09B 23/32 73/379.01 |
| 2008/0143895 A1* | 6/2008 | Peterka | G02B 27/0093 349/15 |
| 2008/0286736 A1* | 11/2008 | Browne-Wilkinson | G09B 23/32 434/274 |
| 2008/0312549 A1 | 12/2008 | Levin et al. | |
| 2009/0118649 A1 | 5/2009 | Cabrera et al. | |
| 2010/0196865 A1* | 8/2010 | Kays | G09B 23/32 434/268 |
| 2015/0148708 A1* | 5/2015 | Cordo | A61B 5/1107 600/587 |
| 2017/0252187 A1* | 9/2017 | Chapman | A61F 2/389 |

OTHER PUBLICATIONS

Zakaria et al, Emulation of Spasticity Symptoms in Upper Limb Part-task Trainer for Physiotherapist Education, Applied Mechanics and Materials, 2013, vol. 393, p. 999-1004.*
Barus et al, The Evaluation and Treatment of Elbow Dysfunction Secondary to Spasticity and Paralysis, Journal of Hand Therapy, Apr.-Jun. 2006, vol. 19, No. 2, p. 192-205.*
Mouri et al, Development of Robot Hand for Therapist Education/Training on Rehabilitation, Proceedings of the 2007 IEEE/RSJ International Conference on Intelligent Robots and Systems, Oct. 29-Nov. 2, 2007, p. 2295-2300.*
Das, Modified Ashworth Scale, accessed on Wayback Machine for Oct. 10, 2012, p. 1-2.*
Translation of Figure 5, Figure 5 right: Interface of Part-task Trainer Program from p. 1002 of Zakaria, Emulation of Spasticity Symptoms in Upper Limb Part-task Trainer for Physiotherapist Education 2013, translated from Japanese.*
Ferre et al, Haptic Device for Capturing and Simulating Hand Manipuation Rehabilitation, IEEE/ASME Transactions on Mechatronics, Oct. 2011, vol. 16, No. 5, p. 808-815.*
Fujisawa et al, Basic Research on the Upper Limb Patient Simulator, Proceedings of teh 2007 IEEE 10th International Conference on Rehabilitation Robotics, Jun. 12-15, 2007, p. 48-51.*
Grow et al, Haptic Simulation of Elbow Joint Spasticity, Symposium on Haptic Interfaces for Virtual Environments and Teleoperator Systems, Mar. 13-14, 2008, p. 475-476.*
Ishikawa et al, Wearable Dummy to Simulate Joint Impairment: Severity-based Assessment of Simulated Spasticity of Knee Joint, Proceedings of the 2013 IEEE/SICE International Symposium on System Integration, Dec. 15-17, 2013, p. 300-305.*
Kikuchi et al, Development of Leg-Robot for Simulation of Spastic Movement with Compact MR Fluid Clutch, 2009 IEEE International Conference on ROobotics and Automation, May 12-17, 2009, p. 1903-1908.*
H. Choi and J. P. How, "On the Roles of Smoothing in Planning of Informative Paths," 2009 American Control Conference, Jun. 2009, pp. 2154-2159, St. Louis, United States of America.

D. Ernst, "Computing near-optimal policies from trajectories by solving a sequence of standard supervised learning problems," TU Delft, Nov. 2006, pp. 1-22, Delft, Netherlands.
D. Svehla and M. Rothacher, "Kinematic Precise Orbit Determination for Gravity Field Determination," Forschungseinrichtung Satellitengeodasie, Institut fur Astronomische and Physikalische Geodasie, Technical University of Munich, Arcisstr, pp. 1-8, Munich, Germany.
T. Kikuchi, K. Oda, S. Yamaguchi, and J. Furusho, "Leg-robot with MR Clutch to realize virtual spastic movements," Journal of Physics: Conference Series 149, 2009, pp. 1-4, Osaka, Japan.
E. Kasner, "Dynamical Trajectories: The Motion of a Particle in an Arbitrary Field of Force," Transactions of the American Mathematical Society, Apr. 1907, pp. 135-158, vol. 8 (2), United States of America.
D. E. Soltero, M. Schwager, and D. Rus, "Generating Informative Paths for Persistent Sensing in Unknown Environments," pp. 1-9, United States of America.
D. Piovesan, M. Casadio, P. Morasso, and P. Giannoni, "Influence of Visual Feedback in the Regulation of Arm Stiffness Following Stroke," Engineering in Medicine and Biology Society (EMBS): Annual International Conference of the IEEE, 2011, pp. 8239-8242.
D. Piovesan, M. Casadio, F. A. Mussa-Ivaldi, and P. Morasso, "Comparing two computational mechanisms for explaining functional recovery in robot-therapy of stroke survivors," Biomedical Robotics and Biomechatronics (BioRob), 2012 4th IEEE RAS & EMBS International Conference, 2012, pp. 1488-1493.
D. Piovesan, M. Casadio, F. A. Mussa-Ivaldi, and P. G. Morasso, "Multijoint arm stiffness during movements following stroke: Implications for robot therapy," Rehabilitation Robotics (ICORR), 2011 IEEE International Conference, Jun.-Jul. 2011, pp. 1-7.
P. Kanade and R. A. Scheidt, "Spatial Mapping of Posture-dependent Endpoint Forces in the Hypertonic Arm Post-stroke," Marquette University, 2009.
D. E. Soltero, M. Schwager, and D. Rus, "Generating informative paths for persistent sensing in unknown environments," Intelligent Robots and Systems (IROS), 2012 IEEE/RSJ International Conference, 2012, pp. 2172-2179.
R. L. Watts, A. W. Wiegner, and R. R. Young, "Elastic properties of muscles measured at the elbow in man: II. Patients with parkinsonian rigidity," J Neurol Neurosurg Psychiatry, Oct. 1986, pp. 1177-1181, vol. 49.
Z. Li-Qun, P. Hyung-Soon, and R. Yupeng, "Shoulder, elbow and wrist stiffness in passive movement and their independent control in voluntary movement post stroke," Rehabilitation Robotics IEEE International Conference, 2009, pp. 805-811.
J. D. Given, J. P. Dewald, and W. Z. Rymer, "Joint dependent passive stiffness in paretic and contralateral limbs of spastic patients with hemiparetic stroke," Journal of Neurology, Neurosurgery & Psychiatry, Sep. 1995, pp. 271-279, vol. 59.
H. Z. Tan, N. I. Durlach, G. L. Beauregard, and S. M.A., "Manual discrimination of compliance using active pinch grasp: The roles of force and work cues," Perception & Psychophysics, 1995, pp. 495-510, vol. 57.
S. Youngung and S. McMains, "Evaluation of drawing on 3D surfaces with haptics," Computer Graphics and Applications IEEE, 2004, pp. 40-50, vol. 24.
Piovesan D., Pierobon A., and Mussa-Ivaldi F.A., "Third-Order Muscle Models: The Role of Oscillatory Behavior in Force Control," International Mechanical Engineering Congress & Exposition ASME-IMECE, 2012.
C. S. Cook and M. McDonagh, "Measurement of muscle and tendon stiffness in man," European Journal of Applied Physiology, 1996, pp. 380-382, vol. 72.
I. D. Loram, M. Lakie, I. Di Giulio, and C. N. Maganaris, "The consequences of short-range stiffness and fluctuating muscle activity for proprioception of postural joint rotations: the relevance to human standing," Journal of Neurophysiology, 2009, pp. 460-474, vol. 102.
T. L. Wren, "A computational model for the adaptation of muscle and tendon length to average muscle length and minimum tendon strain," Journal of Biomechanics, 2003, pp. 1117-1124, vol. 36.

* cited by examiner

HAPTIC DEVICE AND METHODS FOR ABNORMAL LIMB BIOMECHANICS

BACKGROUND

A common consequence of many neurological disorders like cerebral palsy, Parkinson's disease or stroke (to name few) is the appearance of atypical biomechanical conditions such as an increase in muscle tone due to active contraction of the muscle at rest, hyperexcitability of motoneurons, excessive coactivation, muscle contractures, etc. In today's clinical practice, it is common to manipulate a patient's limbs to diagnose these abnormal biomechanical changes. Through such physical interaction, clinicians extract as much information as possible to infer the patients' condition and make an educated assessment. These assessments are usually restricted to ordinal rating scales and single joints (e.g. Ashworth, Tardieu, HAT), which is a limitation when inferring the nature and gravity of the impairment since the effect generated by pluri-articular muscles to multi-joint mechanics can be misjudged. A misjudgment on the initial or intermediate assessments can lead to selecting a non-optimal intervention, which can have negative consequences, such as increasing intervention time, rising in treatment cost, or even worsening the condition. Hence, the capability to discriminate between different types and levels of abnormal biomechanics is important for the clinical intervention to be chosen and planned accordingly.

Traditional engineering approaches such as system-identification techniques provide a less subjective, quantitative measure of biomechanical variables, which are instrumental to assess differences in limb mechanics. A first limitation of such approaches is that these require the use of sophisticated measurement systems, such as stiff robotic devices, making most of these classical engineering methods impractical for the clinical setting do to a high cost/benefit ratio. A second limitation in the prior art is that these have been limited to single joints (e.g. knee, ankle, elbow) as more complex joints (e.g. shoulder) pose significant challenges. Yet, abnormal biomechanics after neurological disorders can encompass alteration of inter-muscular (heteronymous) reflexes or abnormal multi-joint couplings. A third limitation, is that the prior art fails to teach or suggest the diagnosis or treatment of abnormal biomechanics to the clinician. In the attempt to understand how limbs affected by different forms of hypertonia are perceived by the clinicians when being manipulated, researchers have tried to haptically reproduce the physical impairment of stroke survivors via robotic prototypes. Such approaches however, are still limited to only one degree of freedom (DOF) and focus on mimicking current techniques, such as the Ashworth test. Providing a method to enable therapists to appreciate and quantify abnormal limb biomechanics can lead to better training and improved classification, measurement, and treatment of these disorders.

SUMMARY

In one embodiment, a handheld device may be used that improves assessment and quantification of abnormal limb biomechanics. The haptic device is held by both the patient and the therapist during a therapy session. The clinician moves the device in a first probing motion path, thus causing the patient's arm to move in a path that matches the first probing motion path. In response to kinematic information recorded, the device suggests a next probing motion path that will assist in the assessment and quantification of the patient's abnormal limb biomechanics. The clinician may choose to move the device along the next probing motion path or may choose a different probing motion path. The specific probing motion paths (or "paths" or "probing motions" for short) used, and the manner in which the patient's arm moves in response to the probing motions, helps the therapist make an improved determination as to the clinical needs of the patient.

In one embodiment, the clinician may learn the structure of a position and velocity dependent patient's total potential field by identifying the areas within the patient's reachable space that are dynamic, and the rate of change of the potential field for these areas. A "reachable space" is defined as the space in which the patient limb can be moved in a safely manner. A "dynamic" area on the total potential field within the reachable space is defined as those areas in which the forces, resulting from manipulation of the patient's limb, have big changes is both magnitude and direction.

The clinician may utilize a path that allows for sensing of dynamic reachable spaces. We call this path the "most informative trajectory." In one embodiment, the most informative trajectory may be determined by a path planning module that is executed on a computing device. The clinician may use his/her experience, and the output of the path planning module, to give an educated assessment of the patient's impairment.

In one embodiment, the path planning module acquires kinetic information of the handheld haptic device, such as position, velocity and force, as it moves along the probing motion paths. The interaction force between the patient and the clinician that is generated along each probing motion path is translated into a total potential of a cumulative force field computed along the path. Several force fields could be encompassed into a total potential, each of them embedding different characteristics of representative impairments along the chosen path. These sets of total potential (one for each probing motion) can be searched by an informative path planning module, which will suggest to the clinician the next best trajectory to follow for the assessment to uniquely determine the total potential associated with the all patient's impairment characteristics.

A single force field is generated at the hand of the patient by the linear combination of the force fields generated by each muscle. The set of forces associated with a set of limb states (e.g. position, velocity) in the Cartesian space is a "force field." The abnormal behavior of any muscle or group of muscles will be reflected in the cumulative force field at the hand. Given such cumulative force field, a minimum number of probing motions may be determined that, when executed within the cumulative force field, would produce a force profile along such paths unique to a single neuromuscular condition. Each force profile along a probing motion is therefore easily identifiable from other force profiles along a different probing motion, and identifying the force profile allows the clinician and the system to better identify the patient's impairment.

DETAILED DESCRIPTION

In one embodiment, a method is disclosed that allows clinicians to appreciate and quantify abnormal limb biomechanics during manipulation of the affected limb in multiple degrees of freedom (DOF). The disclosed embodiment may improve the diagnosis, characterization, and quantification of abnormal limb biomechanics; thus facilitating i) the design of targeted interventions or customized treatments; and ii) training of physical therapists, occupational therapists, physicians and others (from now on referred as clinicians). It comprises an assessment approach in which clinicians and computational algorithms participate in the diagnosis process. This addresses the issue of subjectivity in current clinical assessments and the ecological validity of classical engineering approaches.

Certain disclosed embodiments combine human expertise and model-based techniques to train clinicians to understand the causality of the haptic sensation experienced (or felt) during physical manipulation of a patient's limb when afflicted with a particular impairment. They also may assist in assessment of abnormal biomechanics in a useful, valid and reliable manner without the need of sophisticated equipment on-site. Certain embodiments allow for assessment of abnormal biomechanics remotely via the web. Other embodiments provide a test bed for developing novel assessment techniques and targeted interventions.

In one embodiment, the system uses a computational algorithm that searches for an optimal manipulation strategy that results in one or more probing motions. The probing motions produce different haptic sensations when interacting with a patient's affected limb or a model of a patient's limb. The sensations may be rendered on a robotic manipulator.

Figure 1:
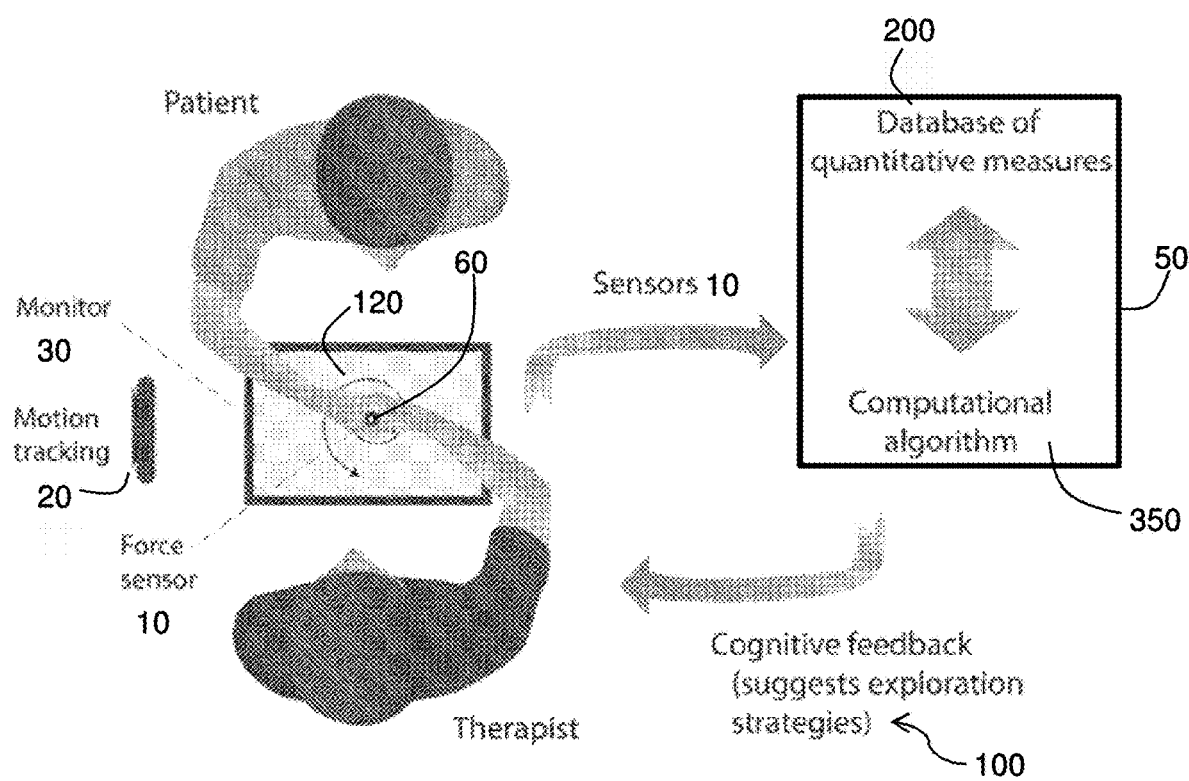
FIG. 1 shows a clinician interacting with a patient using a system to assist in the assessment and determination of the abnormal limb biomechanics of a patient.

In one embodiment, clinicians physically interact with a patient through standard manipulation of the affected limb on-site, as shown in FIG. 1. In this embodiment, the system comprises one or two force sensors [10], a motion tracking system or motion sensor [20], a display [30], speakers (not shown), and a computing device [50].

In FIG. 1 the clinician and the patient hold a device that is able to record the interaction force between the two individuals. The device is comprised of two handles [60] for each of the two participants. In series with the two handles [60], one or two force sensors [10] are juxtaposed so to measure the force transmitted between the hand of the clinician and the hand of the patient.

By using his/her experience the clinician initiates the assessment by moving the patient hand along an initial probing motion. The position, velocity and acceleration of the interaction point between the clinician and the patient, and the configuration of the patient's limb, are recorded by a motion tracking system [20] together with the force along such path. The display [30] is preferably positioned under the limb being manipulated and will show the trajectory along which the contact point between the clinician and patient moved, and the intensity and magnitude of the force exerted at the point of contact along the path.

After the first probing motion, both kinematic and dynamic information are fed into the path planning module [100] that suggests the next optimal probing motion to the clinician for the identification of the impairment. The probing motions suggested by path planning module [100] consider the nonlinear effects of human perception and stereotypical forces produced by the different abnormal biomechanics, e.g. spasticity, dystonia, etc., and can be computed by the method described above.

The clinician may select the initial hypotheses of most probable impairments that the patient most likely has. The path planning module [100] then suggests a minimum number of probing motions to follow for the identification associating each motion with a possible impairment. The system uses position, velocity and force sensors at the contact point. An external motion tracking system keeps track of the patient's limb configuration. Kinematic and dynamic data sensed by these systems are fed into the path planning module [100] which suggests probing motions to be tested. These probing motions are obtained through searches in a database of impairments and biomechanical models, given the information obtained by the sensors and initial educated assessment from the clinician. Using this approach, the algorithm suggests to the clinician a number of probing motions to follow that are displayed on the monitor (preferably under the interaction point). The external display also suggest possible impairments based on biomechanical models and information from the sensors.

The clinician has the freedom to either execute one of the probing motions suggested by the path planning module [100] or execute a different motion according to his/her experience. This approach allows the identification of manipulation strategies (easily recognizable in intensity, location and time course) that maximize exchange of information and can uniquely discriminate among different types of impairments. As a result, a clinician may easily and quickly assess a patient in a routine clinical setting, such as a physical rehabilitation session.

Figure 2:
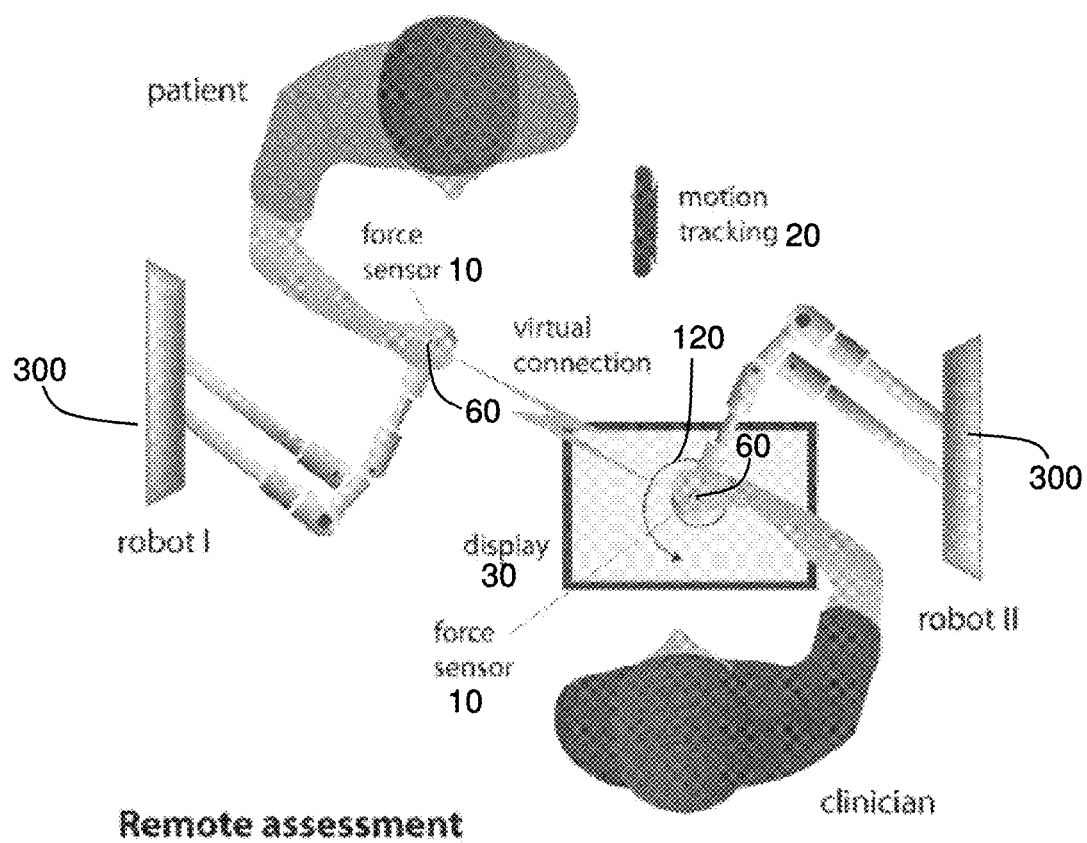
FIG. 2 shows a clinician interacting with a patient using a non co-located embodiment of the system described herein.

FIG. 2 shows a clinician interacting with a patient using a non co-located embodiment of the system described herein. This example uses two robotic devices in two different locations each equipped with the capability to measure the position of the handle and the force transmitted to it. The endpoints of the robotic devices are virtually connected by a controller that mimics a two-way connection. An external motion tracking system on the patient's side keeps track of the patient's limb configuration. By analyzing each human-robot contact point an equivalent human-human contact point can be reconstructed even if the interaction occurs at a distance and through a robotic interface. Similar to the on-site approach, the kinematic and dynamic data are provided to a search algorithm that suggests trajectory probing motion to be tested. The trajectory is suggested to the clinician side and displayed on a screen where the clinician will trace it. While the tracing occurs the robot on the patient side will move accordingly to the movement imposed by the clinician. The reaction force recorded on the patient side will be transmitted to the clinician to be felt on his/her end on the robot.

Figure 3:
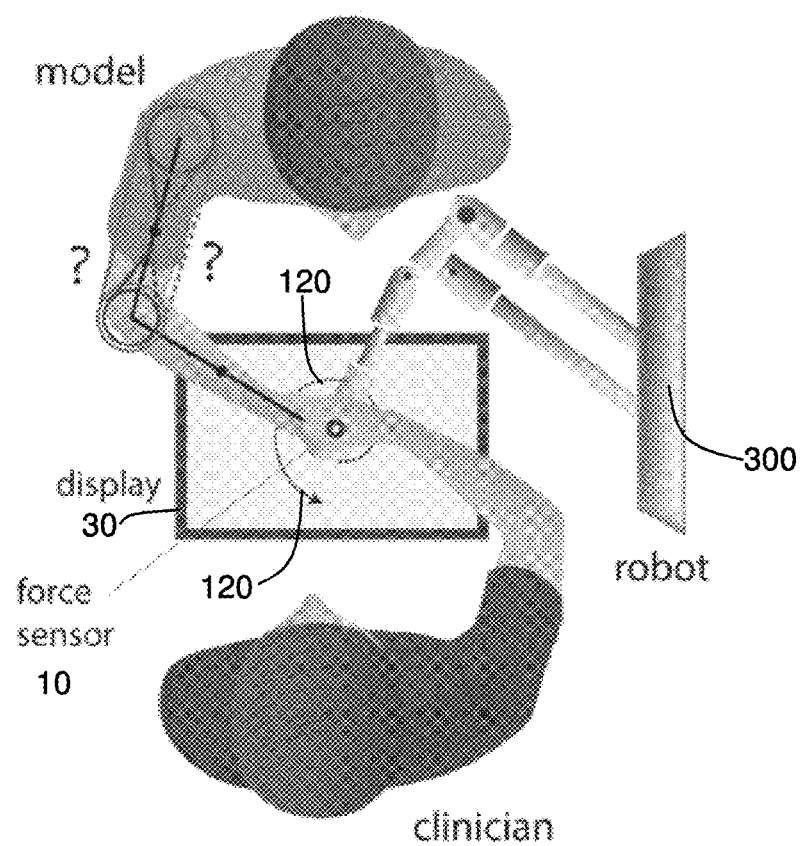
FIG. 3 shows a clinician interacting with a simulated patient rendered on a robotic device (physical simulator).

FIG. 3 shows a clinician interacting with a simulated patient rendered on a robotic device (physical simulator). In this configuration, the clinician holds a device equipped with force, position and velocity sensors, which is attached to the endpoint of the robotic device. The clinician can experience different abnormal limb biomechanics and get trained on diagnosis of such impairments. In another embodiment, the clinician uses the same setup to render the data collected from a real patient using the embodiment shown in FIG. 1. The clinician can then modify different parameters to experience the biomechanical effect of different interventions (e.g. a simulated surgery on a particular tendon-muscle). While the clinician interacts with the robot, the robot provides force to the clinician so that to induce the same sensation of interacting with a patient. This simulation is advantageous as it provides a cognitive feedback to the clinician. Indeed a specific impairment can be programmed and rendered by the robot so that the physician can associate the haptic sensation with the impairment, establishing a reinforcement learning process.

Probing motions may be executed during clinician-patient physical interaction in order to optimally diagnose, characterize, and test the effect of treatment of abnormal biomechanical impairments. A set of stereotypical probing motions within the reachable space, and the force generated along such motions, can be used as a clear discriminator to identify individual characteristics of a patient's impairment.

Figure 4:
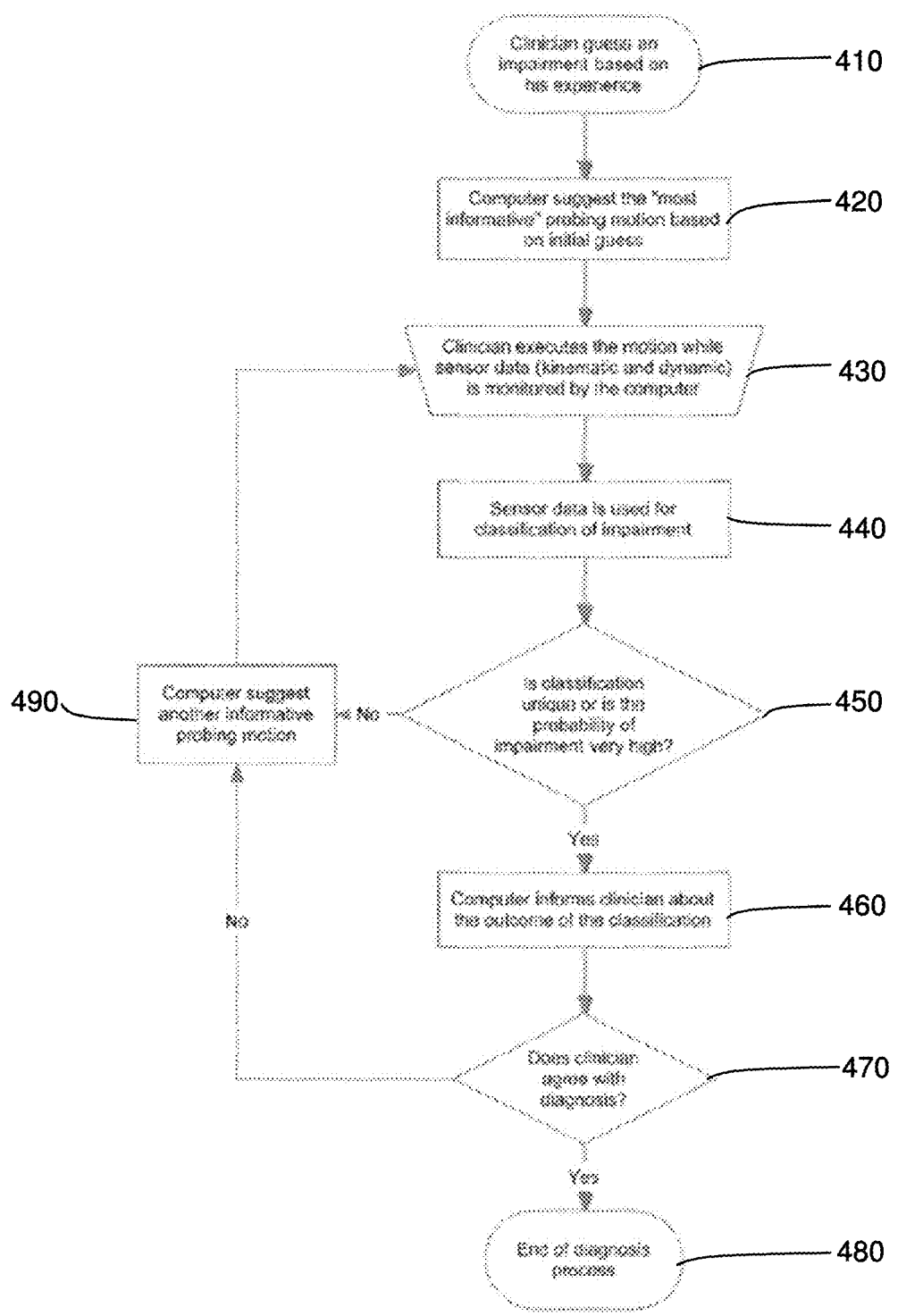
FIG. 4 shows a flow chart setting out a method for assessing a patient with abnormal limb biomechanics.

FIG. 4 shows a flow chart setting out a method for assessing a patient with abnormal limb biomechanics. The clinician first makes an educated assessment 410 of the most likely impairment of the patient based on a general assessment of the patient's condition. The clinician enters this information into the software and it will then suggest a first probing motion 420 for the clinician to test. The clinician then moves the patient's arm along that probing motion trajectory. The velocity, position, and acceleration of the patient's limb is continuously collected by the force sensor 430 as the point of contact between the patient and clinician's hand while moving along this probing motion trajectory. These values are used as inputs to the search algorithm, which determines a set of most probable impairment 440 the subject is suffering. If the probable impairment is unique or the probability of impairment is high 450 the computer informs the clinician about the outcome of the classification 460. If the clinician agrees with the diagnosis 470, the diagnosis process is ended 480. If the impairment is not unique and the probability of impairment is not very high or if the clinician does not agree with the diagnosis, the computer will suggest the next best probing motion 490 to improve the chance to individualize the right impairment at the following probing motion. While the algorithm will suggest a probability to correctly identify the impairment associated with the suggested path, the physician has the freedom to choose one of the probing motions offered by the algorithm 490 that might not have the higher probability of success. The clinician can execute one of the probing motions suggested by the computer algorithm or execute a different motion according to his/her experience. The process continue until the clinician is satisfied with the diagnosis 480. This process can be perform with a real patient or with a simulated patient using a physical simulator for training.

In one embodiment, the impairment may be represented by the sum of position dependent potential fields for the passive components of the patient's muscles and position and velocity dependent potential fields obtained by the combination of N potential fields for the active components, where N is the number of discrete velocities tested.

Figure 7:
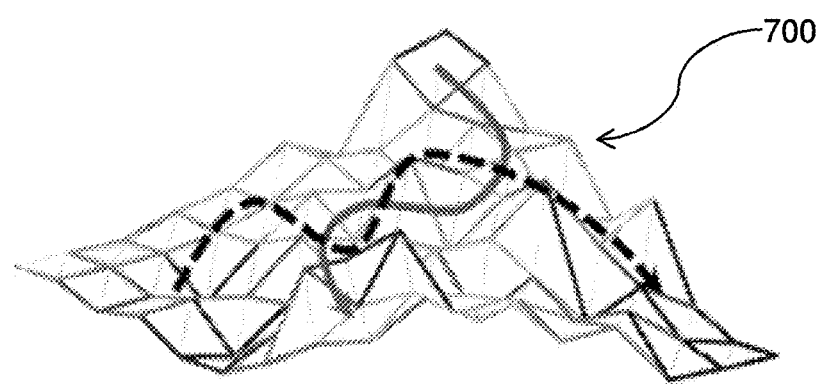
FIG. 7 shows a potential field that represents a patient and how two different probing motions may move along the field.

FIG. 7 shows a potential field that represents a patient and how two different probing motions may move along the field. The searching algorithm tries to find the most informative probing motion based on the characteristics of different potential fields that represent different impairments. The cumulative sum of these fields can be represented geometrically as a surface with mountains and valleys as shown in potential field [700] at FIG. 7. The probing motion and the force associated with it are equivalent to tracing a curve of such surface. The whole surface representing a potential field can be identified by a subset of information about it, in particular by a subset of contour lines obtained via the probing motions. As shown on potential field [700], two probing motions are presented that identify the salient features of the surface of potential field [700]. The solid arrow shown in potential field [700] represents one probing motion and the dotted arrow shown in potential field [700] represents a different probing motion. It is clear to see that the different probing motions will experience different dynamics.

Before moving an arm along different probing paths, a set of representing abnormal biomechanics may be stored in a biomechanic database [200] that can be used as a source of comparison when a patient is manipulated by the clinician and position, velocity and force data of the patient's movements are recorded.

In one embodiment, the construction of the biomechanic database [200] is obtained by testing numerous patients with different impairment with a robotic manipulator [300]. The robotic manipulator [300] (also known as robot [300]) may be any robotic system with any kinematic arrangement (as set out in more detail in Spong et al, Robot Modeling and Control (2006)) that can provide either forces and torques, or impose position, velocity and acceleration in two or more dimensions in space. As an example, a programmable robot known as the HapticMaster from FCS Control Systems may be used. The HapticMaster is a cylindrical robot that comprises a boom with an end-effector. The boom pivots about a single point so that the instrument tip may move within a three-dimensional wedge of space. In another embodiment, the physical simulator may comprise a two revolute joint planar robot of the kind described in U.S. Pat. No. 5,466,213.

Figure 8:
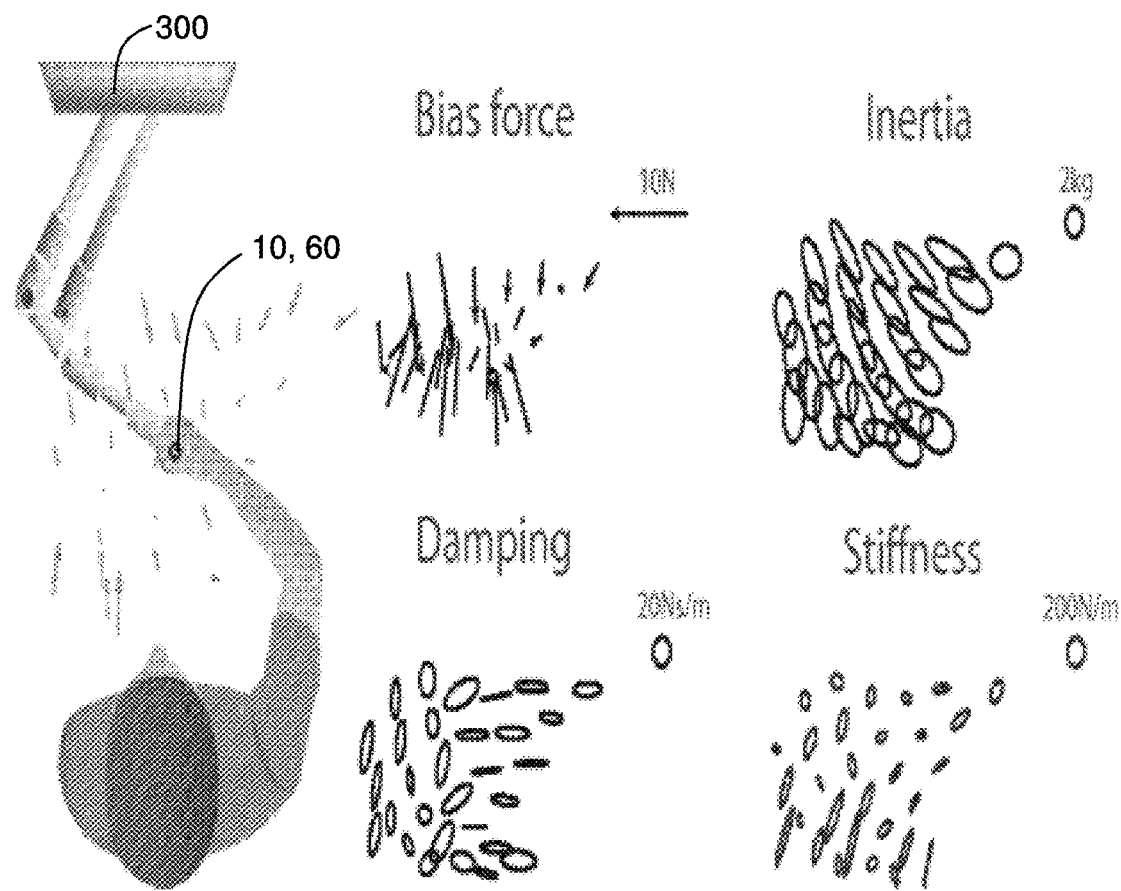
FIG. 8 shows a decomposition of forces obtained through manipulation of a patient with a robotic device.

A possible configuration for the acquisition of a detailed potential field from a patient is presented in FIG. 8. A patient may sit across from the robot. The patient may grab the handle with the end-effector positioned at the center of the robot's workspace. The patient's seat position may be adjusted such that i) their right shoulder acromion is aligned to the imaginary line joining the robot's shoulder joint and the center of the robot's workspace and ii) that the distance between the hand and the acromion ranges between 30 and 40 cm. This configuration keeps an elbow flexion for the subject of approximately 110°, and a shoulder adduction of about 30°. The embodiment of the device may include a screen for visual display. In one embodiment, both the patient's hand and the robot are covered by an opaque horizontal screen.

Posture maps—After measuring the reachable workspace of the impaired arm of a patient, the robot positions the subject's hand at several points to uniformly cover the reachable space. The stationary force (i.e. with zero velocity) produced by the intrinsic properties of the limb is measured at each specific location and illustrated in FIG. 8 as bias force. The force sensor and position sensor attached to the end-effector of the robot are used to sense the force and position of the patient's arm within the reachable space. This is done by following a similar protocol as disclosed by the following references, and which is incorporated by reference: D. Piovesan, M. Casadio, P. Morasso, and P. Giannoni, "Influence of Visual Feedback in the Regulation of Arm Stiffness Following Stroke," *Engineering in Medicine and Biology Society (EMBS): Annual International Conference of the IEEE*, pp. 8239-8242, 2011; D. Piovesan, M. Casadio, F. A. Mussa-Ivaldi, and P. Morasso, "Comparing two computational mechanisms for explaining functional recovery in robot-therapy of stroke survivors," in *Biomedical Robotics and Biomechatronics (BioRob), 2012 4th IEEE RAS & EMBS International Conference on*, 2012, pp. 1488-1493; D. Piovesan, M. Casadio, F. A. Mussa-Ivaldi, and P. G. Morasso, "Multijoint arm stiffness during movements following stroke: Implications for robot therapy," *Rehabilitation Robotics (ICORR), 2011 IEEE International Conference on*, pp. 1-7, Jun. 29, 2011-Jul. 1, 2011 2011; P. Kanade and R. A. Scheidt, *Spatial Mapping of Posture-dependent Endpoint Forces in the Hypertonic Arm Post-stroke*: Marquette University, 2009. These postural maps are stored in the biomechanic database [200].

The force field measured using the postural maps procedure is representative of the intrinsic properties of the arm. The integral of the force field with respect to the position workspace is the potential energy associated with the passive mechanics of the arm, which are taken into account by the path planning module [100]

Stiffness, Damping and Inertia maps—After measuring the static force of the patients by the postural maps procedure the robot [300] perturbs the hand with a combination of small-amplitude sinusoidal perturbations at different frequencies. The local force generated by the perturbation has components that are proportional to the displacement, velocity and acceleration of the local perturbation. These coefficients of proportionality are called stiffness, damping and inertia respectively. Given a particular testing position in the workspace such coefficients are different for each direction. If the perturbation occurs on a plane for each location it is possible to estimate the stiffness, the damping, and the inertia of the patient's arm in each direction as 2×2 matrices which is represented geometrically in form of ellipses (illustrated graphically in FIG. 8). If we define for each location $F_{bias}$ as the postural force, M as the inertia matrix, B as the damping matrix, and K as the stiffness matrix the local force F generated in response to the perturbation y is in the form $$M \cdot \ddot{y} + B \cdot \dot{y} + K \cdot y + F_{bias} = F \quad (1)$$

The biomechanic module [350] therefore uses the stiffness, damping and inertia for each direction and for a specific location, and the force generated by the patient arm in response of a perturbation as function of the perturbation frequency may be calculated. The local velocity for each perturbation is obtained in order to calculate the velocity dependent stiffness at the particular location. Given the amplitude of the perturbation and the frequency of oscillation the calculation of the hand velocity can be found with methods that are well known in the art. In particular, the peak velocity for sinusoidal perturbation of amplitude A and angular frequency ω is v=Aω. By integrating each map twice with respect to the position, biomechanic module [350] obtains a potential describing the active component of the muscle at a specified velocity.

For each patient, the biomechanic module [350] obtains position dependent potential fields for the passive components of the muscles and position and velocity dependent potential fields obtained by the combination of N potential fields for the active components, where N is the number of discrete velocities tested.

The procedure described gives an objective measure of the impairment by measuring a total potential. However, such procedure is quite lengthy and might not be adopted on a regular basis in the clinical setting.

On the other hand, if a biomechanic database [200] containing data relating to the possible impairment of muscles of multiple patients has already been collected using biomechanic module [350], then the complete feature of the total potential can be identified by analyzing the force generated when moving the subject limb's endpoint along a single "most informative" closed trajectory, as shown by D. E. Soltero, M. Schwager, and D. Rus, "Generating informative paths for persistent sensing in unknown environments," in Intelligent Robots and Systems (IROS), 2012 IEEE/RSJ International Conference on, 2012, pp. 2172-2179, incorporated by reference. This operation is known in the robotic field as "informative path planning". Autonomous guided vehicles (AGVs) operating in dynamic and unknown environments are often faced with the problem of deciding where to go to get the most relevant information for their current task. The dynamic environment is assumed to be unknown to the AGV, but the automaton has a sensor to measure the environment. The environment can be described using a potential function such as an elastic energy where maxima of the potential are associated with repulsive forces which represent obstacles to avoid. Minima in the potential correspond to attractive forces representing waypoints.

This framework closely resembles the problem a clinician faces when testing a patient. The total potential, whose gradient are the characteristic forces of the patient's hypertonic arm are unknown to the clinician (they need to be assessed). Conversely, the clinician has the capability to "perceive" the force generated by hypertonic arms, as the AGV can sense the environment. In this embodiment the clinician may interface with the patient using force sensors [10] to measure the interaction force at the contact point between the clinician's hand and the patient's hand, as well as motion tracking sensor [20].

Clinicians may learn the structure of a patient's total potential by identifying the areas within the patient's reachable space that are dynamic, and the rate of change of the potential for these areas. Given the structure of total potential, we conceive a path for the clinicians to allow them sensing such dynamic areas. On the other hand, the choice of a single joint assessment strategy commonly used in clinical practice reside in the intrinsic limitation of human cognition such as limited memory, coarse sensitivity to force, space and time, difficulty to process large amount of data. Furthermore, due to the nature of the problem (i.e. assessing an unknown complex system) there is an inherent absence of cognitive feedback. Indeed, even if the correct assessment is made, the therapist cannot know for certain if the impairment was assessed accurately, since there isn't any gold standard to compare it with.

To solve this problem we can outsource the computation of the "most informative trajectory" to path planning module [100]. The clinician can use his/her experience and the output of path planning module [100] to give an educated guess of the patient's impairment. By acquiring position and velocity of the clinician/patient interaction path, and the interaction force between them generated along such path can be immediately translated into a set of total potential that considers these sensed information. These set of total potential that can be searched within the biomechanic database [200] by the path planning module [100], which will suggest to the clinician the next best trajectory to follow for the assessment to uniquely determine the total potential associated with the patient's impairment.

In this embodiment, the clinician may select the initial choices of most probable impairments. The force and trajectory will be measured by the force sensors [10] described above and in FIG. 1. The data are transmitted to a computer where they are used by path planning module [100] to compute a potential contour line [120]. After comparing the potential contour line [120] generated by the probing motion with the potential associated with the most common impairment stored in the database, path planning module [100] will suggest a set of probing motions for the clinician to follow. Each motion is associated with a possible impairment of the patient's limb. This can be done by using an adaptation law for parameter estimation, and optimizing a coverage task based on Voronoi partitions.

While the path planning module [100] will suggest a probability of correctly identifying the impairment associated with the path it suggests, the clinician has the freedom to choose one of the probing motions offered by the path planning module [100] that might not have the highest probability of success. The clinician can execute one of the probing motions suggested by the path planning module [100] or execute a different motion according to his/her expertise.

To make a diagnosis, different embodiments may rely on a mixture of human expertise and a computational algorithm. The path planning module [100] searches on the biomechanic database [200]. In the biomechanic database [200], the classification of the impairment is sorted as function of their frequency of occurrence (frequentist statistical approaches). Given the force generated during the first "most informative trajectory", a the path planning module [100] compares the force profile generated on the tested patient along such trajectory with all the potential fields within the database and suggests a few most probable alternative field with the associated "most informative trajectory". The number of alternative proposed are ranked using a probabilistic approach and the user can set a minimum threshold of probability above which a most informative probing motion is presented.

The clinician then decides based on her/his experience which probing motion to do next of those suggested by the algorithm. Using an exclusion algorithm, given "N" impairments it is possible to compute "N−1" trajectory that characterize a field uniquely. Given the outcome of the probing motion, the computer searches within the database and either confirms the impairment or suggests the next probing motion based on the second most probable impairment present in the database. This way the number of probing motions is greatly reduced from the N−1 probing motions theoretically necessary to discriminate a single impairment out of N.

Using this approach, a robotic device [300] can be used for validating the mathematical models of the impairment and building a probability function of the frequency of the impairment. Accordingly, a database of probing motions and associated force profiles that correspond to different abnormal biomechanics can greatly assist in the diagnosis of a patient.

Neuromechanical model of a human limb. Force produced by muscles can be expressed in terms of passive (i.e. intrinsic physical properties) and active (i.e. reflexes and voluntary activation) components. The combination of forces generated by different muscles groups gives rise to characteristic force patterns at a limb's endpoint. The set of forces associated with a set of limb states (e.g. position, velocity) in the Cartesian space is a force field. The force of each muscle group is modeled as a linear combination of non-linear passive and active components. The passive component is position dependent and it is function of the muscle length, whereas the active component depends on reflexive activation and is both position and velocity dependent. The resulting force field is the linear superposition of the two force components. This simple, yet representative, approach allows for simulation of different normal and abnormal forces at the point of interaction by modifying few weighting coefficients (i.e. the coefficients of the linear combination between the aforementioned force components). The different abnormal force-fields generated by an impaired limb can be rendered on a robot 300 and so the haptic perception to the nature and severity of different impairments can be investigated systematically.

A clinician may be trained by interacting with the limb model rendered by a robotic device [300] via a two-way connection implemented by a simple spring-damper model. The force experienced by the clinician's hand is given by:

$$F_{hand}^k = K_p((X_{model}^{k-1} - X_m) - (X_{hand}^{k-1} - X_h)) + K_d (\dot{X}_{model}^{k-1} - \dot{X}_{hand}^{k-1}) \quad (2)$$

where the upper-index k represents the current iteration during the simulation; $X^{hand}$ [m] and $\dot{X}_{hand}$ [m/s] corresponds to the position and velocity vectors of the clinician's hand; and $X^{model}$ [m] and $\dot{X}_{model}$ [m/s] corresponds to the position and velocity vectors of the patient's limb model with respect to the user's coordinate system; the terms $X_m$ and $X_h$ [m] are constant values representing the positions at which the virtual connection between the model and the human takes place (i.e. the virtual spring equilibrium position); and $K_p$ [N/m] and $K_d$ [N·s/m] denote the stiffness and damping of such virtual connection.

Figure 5:
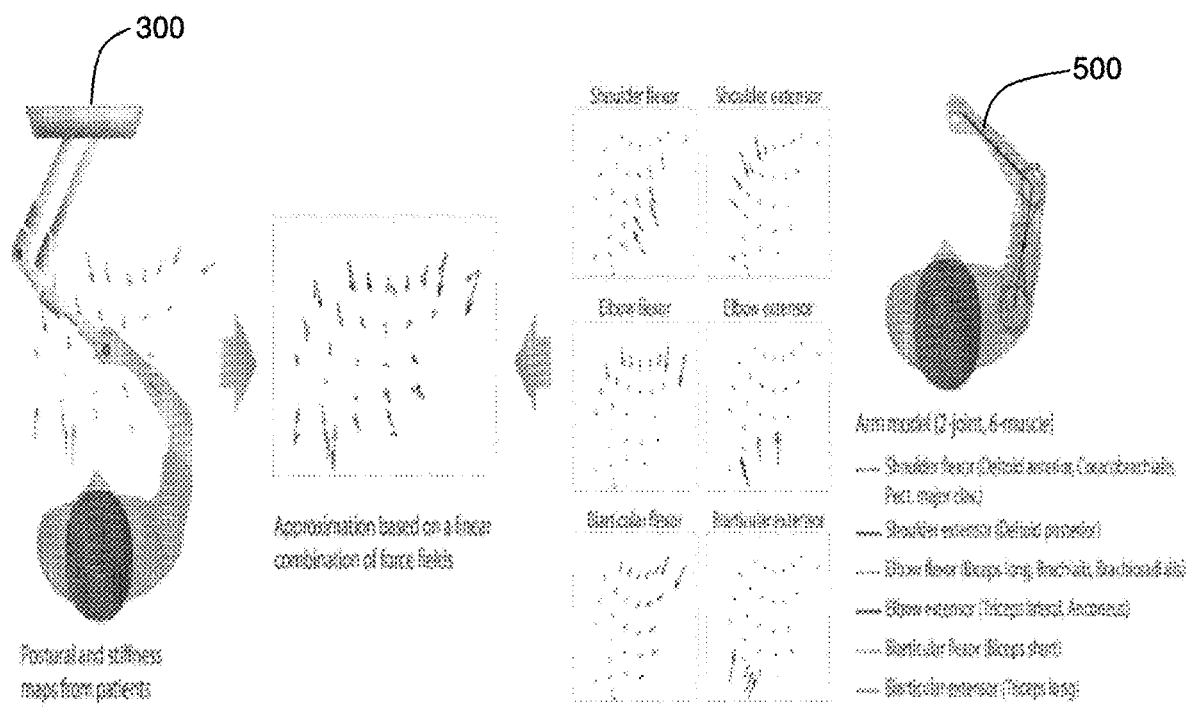
FIG. 5 shows a series of diagrams that assist in identifying ranges of forces exhibited by stroke survivors suffering hypertonia.

As an example, we describe a simple representation of a human arm with six different muscle groups embedded in a planar, two-joint mechanism. An example of such model [500] is given in FIG. 5. It should be understood that the biomechanical model [500] provided here is just one example of a possible model. Those skilled in the art may utilize the embodiments described in this patent with other models, which may be more or less complex, and could apply such models to different limbs of humans or even other animals. FIG. 5 shows a series of diagrams that assist in identifying ranges of forces that stroke survivors suffering hypertonia exhibit so that realistic force fields can be rendered on our physical simulator. The procedure we follow measures the force that stroke survivors passively exert when interacting with a planar robot (left panel) at different points of the reachable plane through both postural as in Mussa-Ivaldi F A, Giszter S F. Vector field approximation: a computational paradigm for motor control and learning. Biol Cybern. 1992; 67(6): 491-500. Epub Jan. 1, 1992. PubMed PMID: 1472573; Kanade P, Scheidt R A. Spatial Mapping of Posture-dependent Endpoint Forces in the Hypertonic Arm Post-stroke: Marquette University; 2009; and stiffness maps Piovesan D, Casadio M, Morasso P, Giannoni P. Influence of Visual Feedback in the Regulation of Arm Stiffness Following Stroke. Engineering in Medicine and Biology Society (EMBS): Annual International Conference of the IEEE. 2011:8239-42; Piovesan D, Casadio M, Mussa-Ivaldi F A, Morasso P G. Multijoint arm stiffness during movements following stroke: Implications for robot therapy. Rehabilitation Robotics (ICORR), 2011 IEEE International Conference on. 2011:1-; incorporated by reference.

An graphical rendering of such model [500] is given in FIG. 5. The dynamics of the virtual arm moving in a horizontal plane while interacting with the environment are modeled as:

$$H(\ddot{q}) + C(q,\dot{q})\dot{q} = -J_q(q)^T F_{hand} - J_\lambda(\lambda)^T \cdot (\Phi(\lambda, u(\dot{\lambda})) + \Psi(\lambda)) \quad (3)$$

H(q) is the arm inertia matrix and is defined as:

$$H(q) = \begin{pmatrix} a_{11} & a_{12} \\ a_{21} & a_{22} \end{pmatrix} \quad (4)$$

$$a_{11} = I_1 + I_2 + m_1 l_{m1}^2 + m_2(l_1^2 + l_{m2}^2 + 2l_1 l_{m2}\cos(q_2))$$

$$a_{12} = a_{21} = I_2 + m_2(l_{m2}^2 + l_1 l_{m2}\cos(q_2))$$

$$a_{22} = I_2 m_2 l_{m2}^2$$

$q_1$ and $q_2$ denote the shoulder and elbow joint angles [rad] and are obtained from the inverse kinematic transformation of the arm; $l_1$ and $l_2$ denote the segment lengths of the upper arm and forearm [m]; $l_{m1}$ and $l_{m2}$ denote the upper arm and forearm center of mass from proximal joint in [m]; $m_1$ and $m_2$ the upper arm and forearm masses [kg]; and $I_1$ and $I_2$ the upper arm and forearm mass moment of inertia [kg·m²]. Simulation-specific parameters are estimated using anthropometrical tables from D. A. Winter, Biomechanics and motor control of human movement, 3rd ed.: John Wiley & Sons, 2004, which is hereby incorporated by reference:

$$m_1 = 0.028 m_{subject}; \; l_{m1} = 0.436 l_1; \; I_1 = (0.5421_1)^2 m_1;$$

$$m_2 = 0.016 m_{subject}; \; l_{m2} = 0.430 l_2; \; I_2 = (0.5261_2)^2 m_2 \quad (5)$$

$C(q,\dot{q})\dot{q}$ is the term corresponding to Coriolis and centripetal forces and is defined as:

$$C(q,\dot{q})\dot{q} = \begin{pmatrix} m_2 l_1 l_{m2} \dot{q}_2 (2\dot{q}_1 + \dot{q}_2)\sin(q_2) \\ m_2 l_1 l_{m2} \dot{q}_1^2 \sin(q_2) \end{pmatrix} \quad (6)$$

The Jacobian matrix $J_q$ transforming endpoint force into joint torque is given by:

$$J_q(q) = \begin{pmatrix} -l_1\sin(q_1) - l_2\sin(q_1+q_2) & -l_2\sin(q_1+q_2) \\ l_1\cos(q_1) - l_2\cos(q_1+q_2) & l_2\cos(q_1+q_2) \end{pmatrix} \quad (7)$$

Depending on the model (e.g. muscles attached to bones via constant insertion points), the Jacobian matrix transforming muscle tension into joint torque, $J_{80}(\lambda)$ can depend on the muscle lengths $\lambda$ [m]. This term essentially contains the muscle moment arms $\rho$ [m] at any particular position. For simplicity, the moment arms can be considered constant with values falling on reported anthropometric data in the literature, thus:

$$J_\lambda(\lambda) = \begin{pmatrix} -\rho_{sf} & 0 \\ \rho_{se} & 0 \\ 0 & -\rho_{ef} \\ 0 & \rho_{ee} \\ -\rho_{bf_1} & -\rho_{bf_2} \\ \rho_{be_1} & \rho_{be_2} \end{pmatrix} \quad (8)$$

The sub-indexes correspond to sf, shoulder adductors (Deltoid anterior, Coracobrachialis, Pectoralis major clav.); se, the shoulder abductors (Deltoid posterior); ef, elbow flexors (Biceps long, Brachialis, Brachioradialis); ee, elbow extensors (Triceps lateral, Anconeus); bf, bi-articular flexors (Biceps short); and be, bi-articular extensors (Triceps long) muscle groups. The position of these muscle groups in the geometrical model are represented in FIG. 5. The force of each muscle group is modeled as a linear combination of active (i.e. produced by a motor command u) and passive (i.e. produced by intrinsic rigidity of the muscles and connective tissue) components. The force produced on each muscle by the motor command u is given by:

$$\Phi(\lambda, u(\dot{\lambda})) = (\varphi_{sf} \; \varphi_{se} \; \varphi_{ef} \; \varphi_{ee} \; \varphi_{bf} \; \varphi_{be})^T \quad (9)$$

$$\varphi_i = \max\left(0, \; \alpha_i u(\dot{\lambda}_i)\left(\frac{\lambda_i}{\lambda_{max,i}} - (1 - u(\dot{\lambda}_i))\right) e^{-\left(\frac{\lambda_i}{\lambda_{max,i}} - (1 - u(\dot{\lambda}_i))\right)^2}\right)$$

The term $\alpha$ corresponds to the muscle stiffness, and $u(\dot{\lambda})$ to an active motor command that depends on the muscle stretch velocity and is defined as:

$$u(\dot{\lambda}_i) = \beta_i \min\left(1, \; \max\left(0, \; \frac{\dot{\lambda}_i}{\dot{\lambda}_{max,i}}\right)\right) \Big| \beta_i \in [0,1] \quad (10)$$

where $\beta$ corresponds to a "stretch reflex gain".

The force produced by the intrinsic rigidity of the muscles and connective tissue is function of the muscle length and is defined as:

$$\Psi(\lambda) = (\psi_{sf} \; \psi_{se} \; \psi_{ef} \; \psi_{ee} \; \psi_{bf} \; \psi_{be})^T \quad (11)$$

$$\psi_i = \max\left(0, \; K_{m,i}(\lambda_i - \lambda_{rest,i}) e^{-(\lambda_i - \lambda_{rest,i})^2}\right)$$

The term $\Psi(\lambda)$ can be multiplied by a generalized logistic function to avoid sharp discontinuities when adding both passive and active components.

The term $\lambda$ and $K_m$ represent the muscle length and muscle rigidity respectively. An example of the force field at the hand that each $\psi_{ij}$ can exert independently is presented in FIG. 5

Physiological parameters in the embodiment may be chosen based on values falling on reported anthropometric data in the literature. For the values of mass and arm lengths in eq. (5), the following values were used. It should be noted that other values may be used without deviating from the scope of the invention:

$$m_{subject} = 75 [kg]$$

$$l_1 = 0.31 [m]$$

$$l_2 = 0.35 [m]$$

$$m_{subject} = 75 [kg]$$

$$l_1 = 0.31 [m]$$

$$l_2 = 0.35 [m] \tag{12}$$

The moment arms in Eq.(8) were chosen on the simulation reported by D. W. Franklin, E. Burdet, P. T. Keng, R. Osu, C. M. Chew, T. E. Milner, and M. Kawato, "CNS learns stable, accurate, and efficient movements using a simple algorithm," Journal of Neuroscience, vol. 28, pp. 11165-11173, 2008, hereby incorporated by reference:

$$\begin{aligned} \rho_{sf} &= \rho_{se} = 0.03 \\ \rho_{ef} &= \rho_{ee} = 0.021 \\ \rho_{bf_1} &= \rho_{be_1} = 0.044 \\ \rho_{bf_2} &= \rho_{be_2} = 0.0338 \end{aligned} \quad [m] \tag{13}$$

Measurements of joints stiffness and rigidity during passive movements are available in the literature for both stroke survivors and unimpaired individuals, for instance, in the following references, both of which are incorporated by reference: R. L. Watts, A. W. Wiegner, and R. R. Young, "Elastic properties of muscles measured at the elbow in man: II. Patients with parkinsonian rigidity," J Neurol Neurosurg Psychiatry, vol. 49, pp. 1177-81, October 1986; and Z. Li-Qun, P. Hyung-Soon, and R. Yupeng, "Shoulder, elbow and wrist stiffness in passive movement and their independent control in voluntary movement post stroke," in Rehabilitation Robotics, 2009. ICORR 2009. IEEE International Conference on, 2009, pp. 805-811. Based on such data, the algorithm may assume the average joint passive stiffness of unimpaired individuals as the lower boundary of joint rigidity, namely:

$$K_q = \begin{pmatrix} 2 & 0.5 \\ 0.5 & 1 \end{pmatrix} [N \cdot m/rad].$$

The corresponding matrix in Cartesian space is $$K_x = \begin{pmatrix} 23 & -10 \\ -10 & 15 \end{pmatrix} [N/m],$$

calculated at the virtual arm's end point equilibrium position. The upper boundary of joint rigidity was set as $$K_q = \begin{pmatrix} 14 & 3 \\ 3 & 8 \end{pmatrix} [N \cdot m/rad],$$

a value that corresponds to the passive stiffness recorded on stroke survivors with Modified Ashworth Score (MAS) equal to 4 [2, 8]; the corresponding Cartesian rigidity is $$K_x = \begin{pmatrix} 161 & -76 \\ -76 & 124 \end{pmatrix} [N/m].$$

Example of abnormal biomechanics—simulating hypertonic-like forces. Among the numerous factors that characterize hypertonia we are interested in verifying the clinicians' ability to discriminate forces produced by increased muscle rigidity and the nonlinear phenomena associated with velocity dependent stiffness. To this end, we assumed that hypertonic-like forces could be achieved by increasing both intrinsic rigidity $K_m$ and stiffness of the muscle $\alpha$.

Given the upper and the lower boundaries of joint rigidity, our goal was to simulate several degrees of hypertonia that could be recognized by the clinician via proprioceptive feedback. In the haptic literature, the just noticeable difference (JND), or Weber fraction, is an important index representing the sensitivity of the subject to stiffness stimuli. Stiffness JND is defined as the ratio between the perceived difference in stiffness about a specific stiffness level and the stiffness level itself normalized to 100 (i.e. JND=$\Delta K/K*100$) In general $\Delta K$ is the stimulus difference between the first and the third quartile of a stiffness distribution. Different stiffness JND have been obtained empirically, depending on the experimental protocol used. For palpation with a fixed displacement, the value of stiffness JND is around 8%. For free exploration, the JND is much higher and can be up to 67%. Since the rigidity discrimination in the clinical setting is performed with a free movement we imposed as a first approximation a stiffness JND=60% which correspond to a Weber fraction of 0.6. Knowing the stiffness Weber fraction allowed us to set adjacent stiffness levels thus, segmenting the whole range of rigidity between the two aforementioned boundary conditions using five possible levels. The ratio between the stiffness at different levels for the specific muscle group i was set so that:

$$\frac{K_{m,i}^{level}}{K_{m,i}^{level+1}} \in \left[\frac{3}{5}, \frac{5}{8}, \frac{8}{13}, \frac{13}{21}\right] \bigg| level = 0 \ldots 4 \Rightarrow \tag{14}$$

$$\Rightarrow K_{m,i}^{level} = \kappa_{level} K_{nominal,i} \,|\, \kappa = \{3, 5, 8, 13, 21\}$$

thus following a Fibonacci succession that approximates a 0.6 Weber fraction. Notice that also the MAS encompasses five ordinal levels (i.e. 0,1,2,3,4) analogous to our five levels of severity—normal, very mild, mild, moderate and severe. A score of 0 represents a "normal" joint stiffness and a score of 4 corresponds to a very rigid joint (i.e. very hard to move). In addition, it is important to notice that given the linearity of the Jacobian transformation between muscles, joints and Cartesian space, multiplying the muscle stiffness matrix by $\kappa$ will increase rigidity in all the other space by the same amount. The values for the nominal muscle stiffness were chosen as:

$$K_{nominal} = (k_{sf} \; k_{se} \; k_{ef} \; k_{ee} \; k_{bf} \; k_{be}) \tag{15}$$
$$= (540 \; 540 \; 600 \; 600 \; 100 \; 100)[N/m]$$

The ratio between muscle stiffness and rigidity of the connective tissue has been reported to vary between 1:1 and 1:10 [11-14]. According to our parameters, the intrinsic muscle stiffness $\alpha$ was assumed to be ¼ of $K_m^{level}$. A linear increase of "stretch reflex gain" β would thus produce an increase in the active force Φ following a Weber law. Hence, we imposed a linear variation of β from 0 to 1 in Eq. (10) in intervals of 0.25. We tested five equally spaced levels of reflex gains which can be associated to the five levels of severity of our task.

TABLE I

JOINT AND CARTESIAN STIFFNESS WHEN ALL MUSCLE GROUPS ARE IMPAIRED

| Level of severity | β | κ | $K_q \mid \dot{\lambda} = 0$ [N · m/rad] | $K_x \mid \dot{\lambda} = 0$ [N/m] |
|---|---|---|---|---|
| Normal | 0.0 | 3 | $\begin{pmatrix} 2.03 & 0.47 \\ 0.47 & 1.18 \end{pmatrix}$ | $\begin{pmatrix} 23.48 & -10.65 \\ -10.65 & 17.72 \end{pmatrix}$ |
| Very mild | 0.25 | 5 | $\begin{pmatrix} 3.39 & 0.78 \\ 0.78 & 1.96 \end{pmatrix}$ | $\begin{pmatrix} 39.14 & -17.76 \\ -17.76 & 29.54 \end{pmatrix}$ |
| Mild | 0.5 | 8 | $\begin{pmatrix} 5.43 & 1.26 \\ 1.26 & 3.15 \end{pmatrix}$ | $\begin{pmatrix} 62.62 & -28.42 \\ -28.42 & 47.27 \end{pmatrix}$ |
| Moderate | 0.75 | 13 | $\begin{pmatrix} 8.83 & 2.05 \\ 2.05 & 5.15 \end{pmatrix}$ | $\begin{pmatrix} 101.76 & -46.18 \\ -46.18 & 76.82 \end{pmatrix}$ |
| Severe | 1.0 | 21 | $\begin{pmatrix} 14.27 & 3.31 \\ 3.31 & 8.27 \end{pmatrix}$ | $\begin{pmatrix} 164.39 & -74.60 \\ -74.60 & 124.10 \end{pmatrix}$ |

To render the different hypertonic conditions in our experiment, the hypertonic gains (i.e. β and κ in Eqs. (10) and (14)) were selected according to the muscle group of interest. For the hypertonic shoulder hypertonic gains were imposed for the sf and se, while for the rest of the muscle groups (ef, ee, bf and be) these gains were set to normal; for the hypertonic elbow, only ef and ee were modified; and for the hypertonic bi-articular, only bf and be were changed. As an example, to render a moderate hypertonic shoulder the muscle rigidity vector $K_m$ in Eq. (11) would be set to:

$$K_m = (13k_{sf} 13k_{se} 3k_{ef} 3k_{se} 3k_{bf} 3k_{bb}) \quad (4)$$

and the "stretch reflex gain" vector β in Eq. (10) would be set to:

$$\beta = (0.75\ 0.75\ 0\ 0\ 0\ 0) \quad (5)$$

Of course, one of ordinary skill in the art would understand other ways to program a manipulator in order to model various abnormal forces or different limbs. For example, software such as SIM or OpenSim may be used to provide a modeling select attributes of additional arm muscles, including position, velocity, acceleration, and force attributes. See, e.g., Seth et al, OpenSim: a musculoskeletal modeling and simulation framework for in silico investigations and exchange in 2011 Symposium on Human Body Dynamics (2011), incorporated by reference; Delp SL, Anderson FC, Arnold AS, Loan P, Habib A, John CT, Guendelman E, Thelen DG. OpenSim: Open-source Software to Create and Analyze Dynamic Simulations of Movement. IEEE Transactions on Biomedical Engineering. (2007), incorporated by reference.

A biomechanical model [500] of a limb can be used in the different embodiments as follows: i) after using the biomechanics module [350] which is used for assessing the total potential [700] specific for the overall impairment of the patient, the biomechanics model can be used to obtain a parameterization of the impairment. An example is illustrated in FIG. 5, where the cumulative force field proper of the total potential [700] can be decomposed in a number of force fields (one for each modelled muscle in [500]). Each force field generated by a single muscle is dependent on the characteristics of the muscle illustrated above. Any optimization algorithm of those known in the art, such as a least square minimization, will be able to estimate the characteristic parameters of the muscles $β_1$ and $K_{m_i}$ as illustrated in equations (9-11) (or equivalent parameters for other forms of equations). Hence, a biomechanical model [500] so computed can be used in ii) Co-located assessment—The path planning module [100] uses both biomechanical model and the biomechanic database to produce the probing motion. iii) Non co-located assessment—The path planning module [100] uses both biomechanical model and the biomechanic database to produce the probing motion. In addition, given that different impedances at the interaction point can create instabilities on a virtual connection, a biomechanical model can also be used to determine safety bounds on the virtual connection between robotic devices. iv) Physical simulator—The biomechanical model is used to render a simulated patient's limb on a robotic device. Once rendered, a clinician can be trained in assessing different impairments. In addition, different parameters can be adjusted on the model to simulate different interventions (e.g. surgical procedures that affect different muscle groups, injections of botulin toxin that reduces activity on muscles, etc.). These simulated interventions can then be tested on the physical simulator. The cumulative force fields, such as those shown in FIG. 5, could be saved in biomechanic database [200]. Values from the cumulative force fields may be used in Equation (3) to provide an improved model [500] that more directly estimates the coefficients of the muscle forces that are directly related to the impairment.

Examples of Probing Motions. As described above, the diagnosis of abnormal biomechanics by a clinician depends on certain subjective judgments regarding whether particular muscles or muscle groups are subject to impairment. For example, patients with severe hypertonia generate different force fields, depending on whether their hypertonic impairments are found in the shoulder, elbow, or bi-articular muscle groups. For instance, a subject with hypertonia in a shoulder flexor, such as the deltoid anterior, coracobrachialis, or pectoral major clavicle, would display a force field having maximums as the subject's hand is moved towards the corresponding shoulder and having minimums as the subject's hand is moved away from the corresponding shoulder. FIG. 5 indicates force fields generated by exemplary arm muscles in a two-joint, six-muscle model [500].

In another aspect, a unique optimal exploration pattern may be used to determine the salient features of a given set of force fields generated by the model used to represent a limb with abnormal biomechanics. A minimum number of probing motions needed to produce a force profile unique to an impairment is desirable, so as to minimize the time needed to make a diagnosis and to avoid exhaustion by the subject and/or the clinician.

In one embodiment, a probing motion may be determined considering only the effect of the positional dependent muscle force. Given the three force fields associated with severe hypertonia—those fields relating to the shoulder, elbow, and bi-articular muscle groups—a minimum number of probing motions may be determined that, when executed within each force field, would produce a force profile unique to the corresponding hypertonic condition. Each force profile along each trajectory is therefore easily distinguishable from the others.

In one embodiment, each probing trajectory includes the locations of the workspace in which the minimum and maximum force magnitude occurs for each field. This method of determining probing trajectories is called the min-max paradigm. Using this paradigm, the set of probing trajectories is designed so that, along the same probing motion, the minimum and maximum force magnitude occurs at different locations for each force-field. According to the min-max paradigm, the arm's equilibrium position (i.e. the center of each circle in FIG. 6) may be included in the probing motion as it is the point of absolute minimum force for all conditions.

Figure 6:
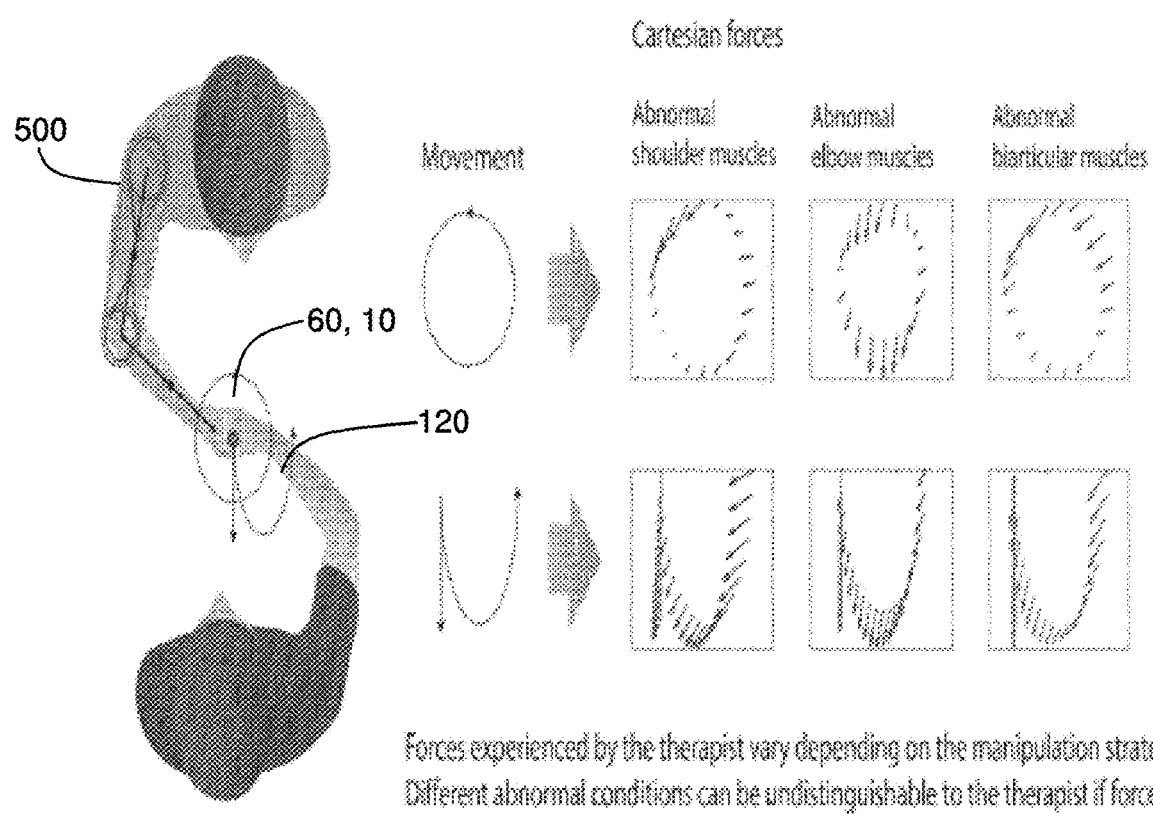
FIG. 6 shows the forces that may be experienced by a clinician when interacting with a simulated patient on a physical simulator, using two different probing motions.

FIG. 6 shows the forces that may be experienced by a clinician when interacting with a simulated patient on a physical simulator, using two different probing motions. Depending on the probing motion, the clinician experiences different forces which can or cannot be distinguishable from each other. Our system suggest different probing motions that, once executed, are most distinguishable from each other. The first row in FIG. 6 represents, for each severe hypertonic muscle groups (shoulder, elbow, and bi-articular) the passive force Θ that is generated by probing trajectories following the circumference of three concentric circles of radius 5, 10, and 15 cm. As shown, the minimum and maximum force occurs in different locations along the circles for hypertonic-shoulder and elbow force fields. As also shown in FIG. 6, however, little difference exists in the location of the minimum and maximum forces in the hypertonic-shoulder force field and the bi-articular force field.

Hence, an extra probing motion is required to distinguish between the two conditions. It can be demonstrated that given n types of force fields, when using the min-max paradigm it is always possible to identify all impairments by exploring n−1 trajectories.

On the other hand, it should be noted that the magnitude of the force is not the only variable that can be discriminated. The orientation of the force is also important as it allows for an unequivocal haptic cue. Such a methodology will be here called the "orientation paradigm." FIG. 6 (bottom row) displays, for each severe hypertonic muscle group, the force profile generated upon pulling the endpoint of an impaired arm from its equilibrium position across a semi-elliptical trajectory, along the mid-sagittal plane in a fast and straight motion. As shown in FIG. 6 (bottom row), the force profile generated by the hypertonic-shoulder force field differs significantly from the force profile generated by the hypertonic-elbow force field or the hypertonic bi-articular force field. Therefore, such a pulling movement may be used to discriminate between a force field from a shoulder impairment and the force fields from all other impairments. This is the second trajectory that may be used to distinguish a shoulder hypertonia from other impairments.

Clinician training A clinician may sit across from the robot. The clinician may grab the handle with the end-effector positioned at the center of the robot's workspace. The clinician's seat position may be adjusted such that i) their right shoulder acromion is aligned to the imaginary line joining the robot's shoulder joint and the center of the robot's workspace and ii) that the distance between the hand and the acromion ranges between 30 and 40 cm. This configuration keeps an elbow flexion for the subject of approximately 110°, and a shoulder adduction of about 30°. The embodiment of the device may include a screen for visual display. In one embodiment, both the clinician's hand and the robot are covered by an opaque horizontal screen, on which the image of the rendered virtual arm may be projected, via projector or other display means. The arm model is rendered as if the virtual patient was seated opposite the participants. The model's shoulder joint may also be aligned to the imaginary line joining the robot's shoulder joint and the center of the robot's workspace. In this embodiment, the distance between the model's shoulder joint and the center of the robot's workspace is fixed at 30 cm; and the model's equilibrium position is such that the virtual hand matches the center of the robot's workspace. After the physical simulator has been activated (as shown in FIG. 3), the virtual limb moves in response to the subject's hand position, and a force field is rendered to the user's hand depending on the degree of impairment programmed for the virtual limb.

In one embodiment, the physical simulator is programmed using a model that represents the human arm, with six different muscle groups embedded in a double pendulum. It should be understood that other models, including those that include additional muscle groups, may be used instead. For instance, the force of each muscle group may be modeled as a linear combination of passive and active components. The passive component is position-dependent and it is a function of the muscle length, whereas the active component depends on reflexive activation and is both position- and velocity-dependent. The resulting force is a linear combination of the two forces whose scalar coefficients represent the intrinsic rigidity of the connective tissue and the stiffness of the (active) muscle. In this embodiment, different force fields may be obtained by modifying certain weighting coefficients. The forces generated by the model can be rendered on one of the robotic devices described above, so that a clinician interacting with the manipulator may become familiar with the range of motion and accompanying force field of either an unimpaired arm or an arm with a particular impairment (such as a maximally impaired shoulder, maximally impaired elbow, or maximally impaired bi-articular muscle).

From the discussion above, it should be understood that the following systems and methods may be employed in relation to the embodiments described.

Figure 9:
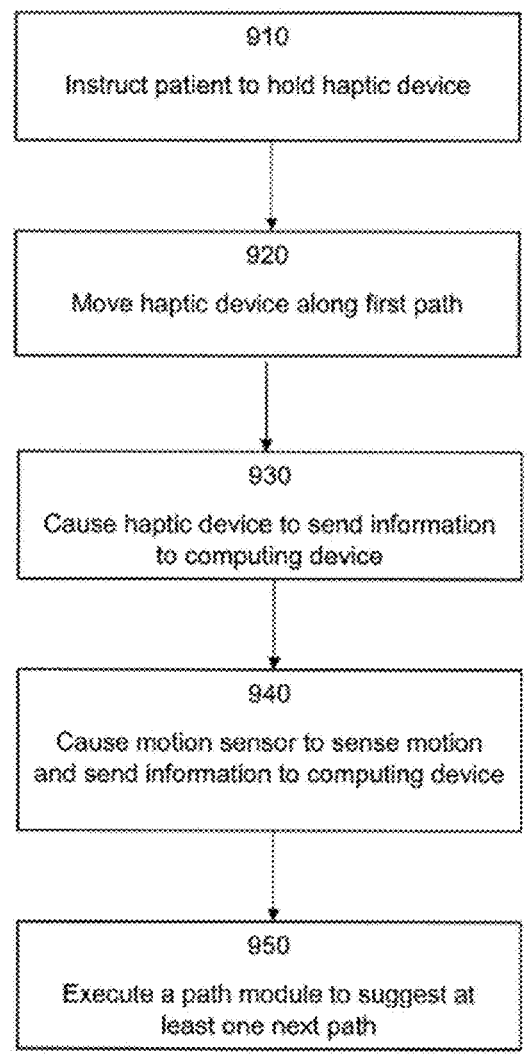
FIG. 9 shows a method of assessing limb biomechanics.

FIG. 9 shows a method of assessing limb biomechanics. In block 910, a step is shown of instructing a patient to hold a haptic device having at least one force sensor. In block 920, a step is shown of moving the haptic device along a first path, while the patient holds the haptic device. In block 930, a step is shown of causing the haptic device to send information collected by the at least one force sensor to a computing device. In block 940, a step is shown of causing a motion sensor to sense motion of either the haptic device or the patient and to send information collected by the motion sensor to the computing device. In block 950, a step is shown of causing the computing device to execute a path module that uses at least a portion of the information collected by the at least one force sensor and the motion sensing system to suggest at least one next path. The path module may use at least a portion of information contained in a database of biometric information to suggest at least one next path.

Figure 10:
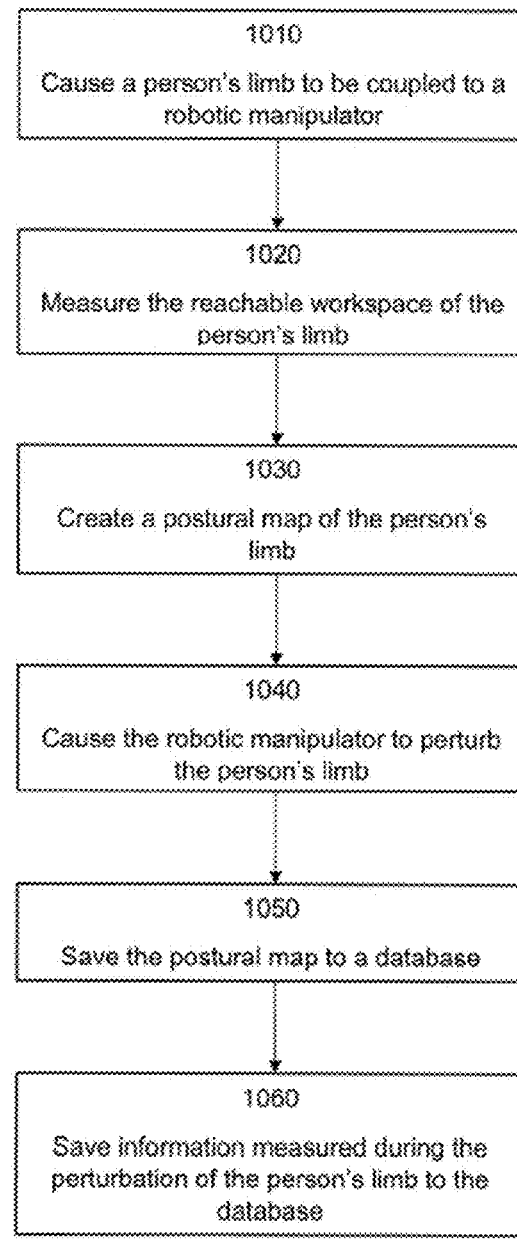
FIG. 10 shows a method of manufacturing a database of biometric information.

FIG. 10 shows a method of manufacturing a database of biometric information. In block 1010, a step is shown of causing a person's limb to be coupled to a robotic manipulator. In block, 1020, a step is shown of measuring the reachable workspace of the person's limb. In block 1030, a step is shown of creating a postural map of the person's limb. In block 1040, a step is shown of causing the robotic manipulator to perturb the person's limb. In block 1050, a step is shown of saving the postural map to the database. In block 1060, a step is shown of saving information measured during perturbation of the person's limb to the database.

Figure 11:
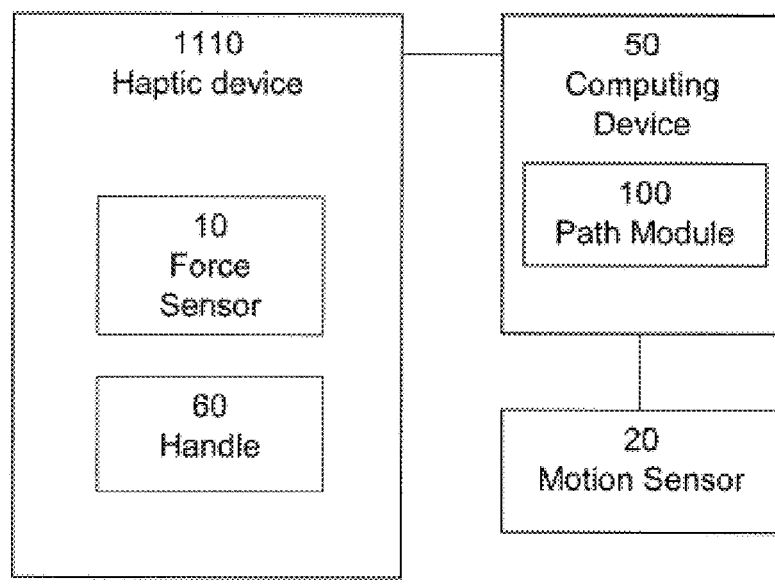
FIG. 11 shows a system of assessing limb biomechanics.

FIG. 11 shows a system of assessing limb biomechanics. The system comprises a haptic device 1110 having at least one force sensor 10 that is configured to be coupled to a computing device 50. The system may further comprise a motion sensor 20 that is configured to be coupled to the computing device 50. The system may further comprise a path module 100, configured to be stored on the computing device 50. The path module 100 may be further configured to suggest a path of movement for the limb of a patient in response to information collected by the at least one force sensor 10 and the motion sensor 20.

Figure 12:
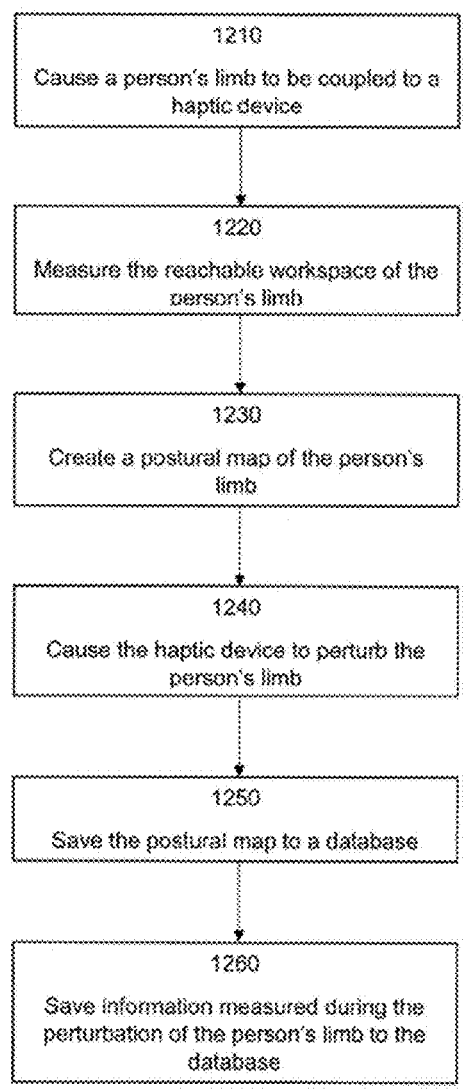
FIG. 12 shows a method of manufacturing a database of biometric information.

FIG. 12 shows a method of manufacturing a database of biometric information. In block 1210, a step is shown of causing a person's limb to be coupled to a haptic device. In block 1220, a step is shown of measuring the reachable workspace of the person's limb. In block 1230, a step is shown of creating a postural map of the person's limb. In block 1240, a step is shown of causing the haptic device to perturb the person's limb. In block 1250, a step is shown of saving the postural map to the database. In block 1260, a step is shown of saving information measured during perturbation of the person's limb to the database.

Figure 13:
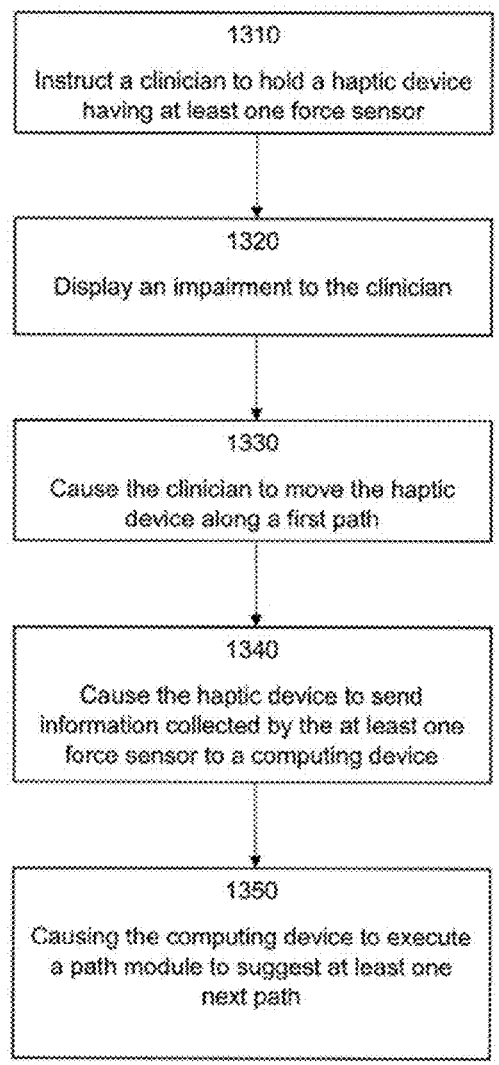
FIG. 13 shows a method of training a clinician to assess limb biomechanics.

FIG. 13 shows a method of training a clinician to assess limb biomechanics. In block 1310, a step is shown of instructing the clinician to hold a haptic device having at least one force sensor, wherein the haptic device has been programmed with an impairment. In block 1320, a step is shown of causing the impairment to be displayed to the clinician. In block 1330, a step is shown of causing the clinician to move the haptic device along a first path. In block 1340, a step is shown of causing the haptic device to send information collected by the at least one force sensor to a computing device. In block 1350, a step is shown of causing a motion sensor to sense motion of either the haptic device or the clinician and to send information collected by the motion sensor to the computing device. In block 1350, a step is shown of causing the computing device to execute a path module that uses at least a portion of the information collected by the at least one force sensor and the motion sensor to suggest at least one next path. The haptic device may be programmed with an impairment by using at least a portion of information contained in a database of biometric information. The portion of information contained in the biometric database may be used to program a model of an impaired limb. It should be understood that the robotic manipulator described here is one example of a haptic device.

What is claimed is:

1. A method, comprising:
providing a device including a first handle for engagement by a clinician, a second handle for engagement by a patient, and a sensor positioned at an interaction point along the device between the patient and the clinician, the sensor operable for measuring an interaction force transmitted at the interaction point during movement of the device and kinetic information including a position, a velocity, and an acceleration at the interaction point; and
providing a computing device in operative communication with the device, the computing device configured for executing steps of:
(a) suggesting a probing path of the device in response to an initial diagnosis of a patient having an impairment,
(b) accessing data including the kinetic information and the interaction force measured by the sensor during movement of the device by the clinician along the probing path while the patient is engaged to the device,
(c) identifying a list of possible classifications of the impairment based on the data,
(d) suggesting a next probing path associated with at least one of the list of possible classifications of the impairment,
(e) accessing additional data including additional kinetic information and an additional interaction force measured by the sensor during movement of the device by the clinician along the next probing path while the patient is engaged to the device,
iteratively repeating steps (d) through (e) until the clinician identifies a classification from the list of possible classifications as being representative of the impairment, and
generating biomechanical data based on the probing path and the next probing path for reference in a database, the biomechanical data defining force-fields associated with a total potential of the classification.

2. The method of claim 1, further comprising:
providing a robotic device in operable communication with the computing device, the robotic device defining a kinematic arrangement including an arm and an end effector defined along the arm that is capable of moving along a predetermined motion path, and a plurality of sensors defined along the arm that obtain movement information about the end effector, wherein the computing device is part of a control system that uses the movement information and the biomechanical data to adjust movement of the robotic device to simulate a human limb having the impairment.

3. The method of claim 1, further comprising providing a display below the device and in operable communication with the computing device wherein the display indicates a trajectory along which the interaction point between the clinician and the patient moves during the probing path and further indicates an intensity and magnitude associated with the probing path and the next probing path.

4. The method of claim 2, wherein the plurality of sensors of the robotic device include at least force, velocity, and position sensors.

5. The method of claim 2, further comprising utilizing the computing device to instruct the robotic device to generate a haptic sensation indicative of the impairment.

6. The method of claim 1, wherein the database includes a plurality of probing motions and associated force profiles that correspond to a plurality of different abnormal biomechanics including the impairment.

7. A system, comprising:
a motion tracking system operable for measuring an interaction force transmitted between a first individual and a second individual during movement of the motion tracking system while the first individual and the second individual are engaged to the motion tracking system; and
a computing device in operative communication with the motion tracking system, the computing device configured to:
(a) suggest a probing path of the motion tracking system in response to an initial diagnosis of the first individual having an impairment,
(b) access data including kinetic information and the interaction force measured by a sensor of the motion tracking system during movement of the motion tracking system by the second individual along the probing path while the first individual is engaged to the motion tracking system,
   (c) identify a list of possible classifications of the impairment based on the data,
   (d) suggest a next probing path associated with at least one of the list of possible classifications of the impairment,
   (e) access additional data including additional kinetic information and an additional interaction force measured by the sensor of the motion tracking system during movement of the motion tracking system by the second individual along the next probing path while the first individual is engaged to the motion tracking system,
   iteratively repeat steps (d) through (e) until the second individual identifies a classification from the list of possible classifications as being representative of the impairment, and
   generate biomechanical data based on the probing path and the next probing path for reference in a database, the biomechanical data defining force-fields associated with a total potential of the classification; and
a robotic device in operative communication with the computing device that is configured to render predetermined forces and torques associated with the force-fields of the classification as the second individual moves the robotic device.

8. The system of claim 7, wherein the database includes a plurality of probing motions and associated force profiles that correspond to a plurality of different abnormal biomechanics including the impairment.

9. The system of claim 7, wherein the kinetic information includes forces and trajectories measured by the sensor of the motion tracking system that the computing device utilizes to compute a potential contour line.

10. The system of claim 9, wherein the computing device is configured to compare the potential contour line with a potential force or field associated with an impairment stored in the database to suggest a set of next probing motions, each of the set of next probing motions being associated with a particular possible impairment.

11. The system of claim 7, wherein a hand of the second individual and the robotic device are covered by an opaque screen, the opaque screen displaying a virtual arm moving in response to movements of the robotic device along the probing path by the second individual.

12. A method, comprising:
providing a motion tracking system including a computing device in operative communication with a robotic device engaged to at least one of a clinician and a patient; and
executing, via the computing device, steps of:
   (a) suggesting a probing path of the robotic device in response to an initial diagnosis of an impairment of the patient,
   (b) accessing data from the robotic device including kinetic information and an interaction force measured during movement of the robotic device by the clinician along the probing path while the patient is engaged to the robotic device,
   (c) identifying a list of possible classifications of the impairment based on the data,
   (d) suggesting a next probing path associated with at least one of the list of possible classifications of the impairment,
   (e) accessing additional data including additional kinetic information and an additional interaction force measured by during movement of the robotic device by the clinician along the next probing path while the patient is engaged to the robotic device, and
   iteratively repeating steps (d) through (e) until the clinician identifies a classification from the list of possible classifications as being representative of the impairment.

13. The method of claim 12, further comprising
generating biomechanical data based on the probing path and the next probing path for reference in a database, the biomechanical data defining force-fields associated with a total potential of the classification; and
configuring the robotic device to render forces and torques to simulate the impairment using the biomechanical data.

14. The method of claim 12, wherein the patient is engaged to a first device of the motion tracking system at a first location, and the clinician is engaged to a second device of the motion tracking system at a second location different from the first location, each of the first device and the second device operable to measure an interaction force and kinetic information including a position, a velocity, and an acceleration.

* * * * *